Nov. 18, 1941.  A. J. CONDO  2,262,885
PLOW BOTTOM PART AND METHOD OF MAKING SAME
Filed May 25, 1937  2 Sheets-Sheet 2
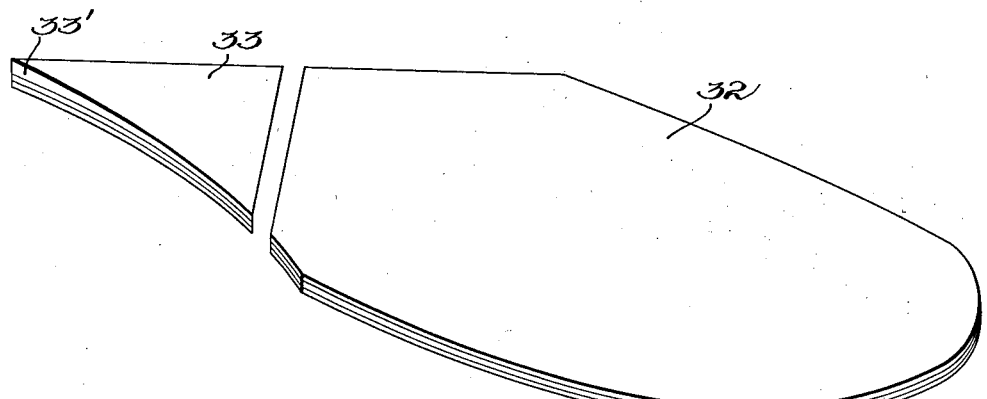
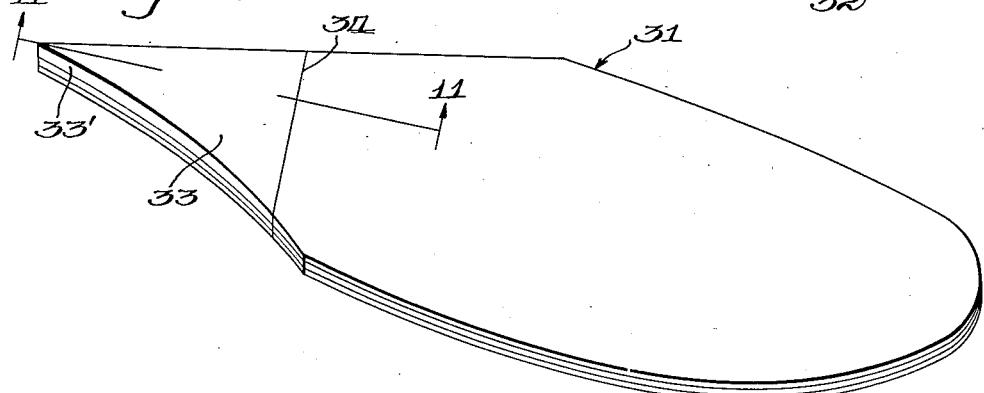
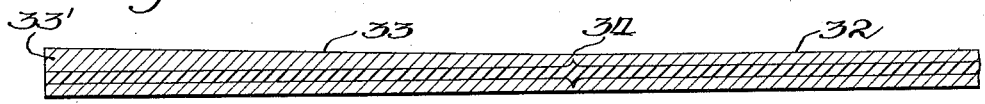
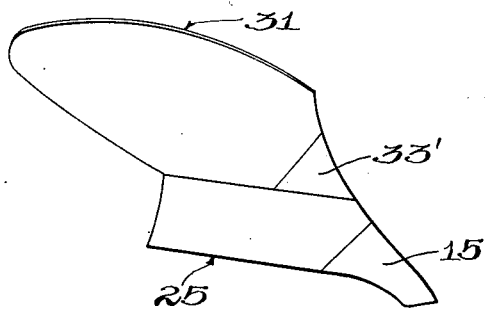
Inventor
Adam J. Condo.
By V. F. Lassagne
Att'y.

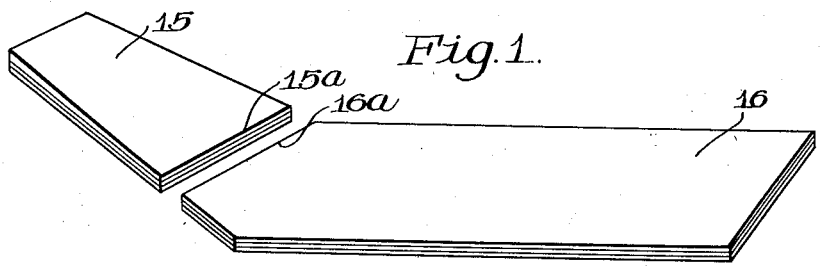
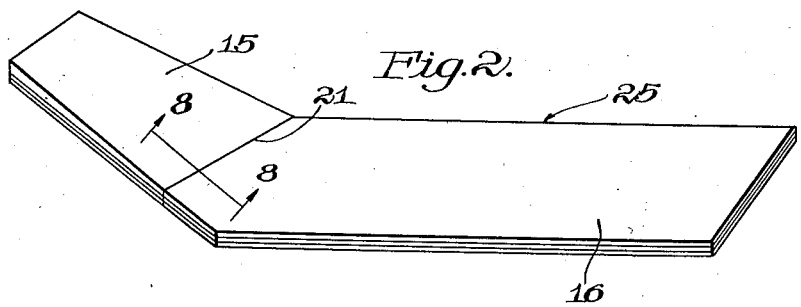
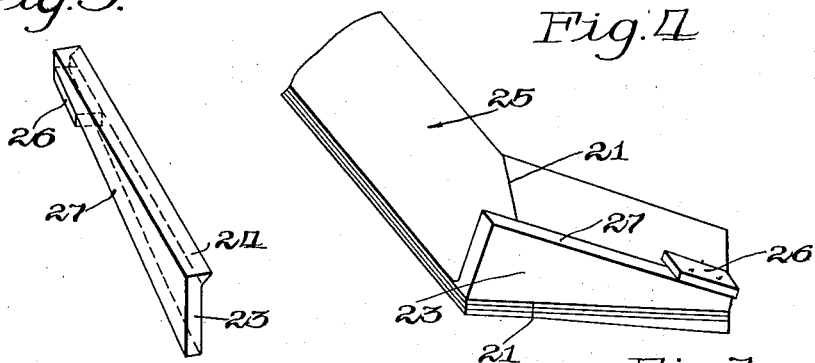
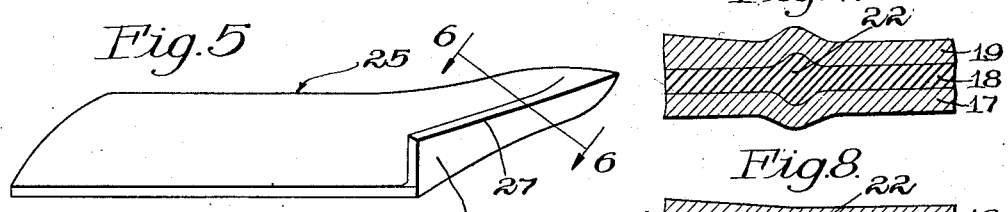
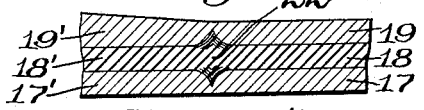
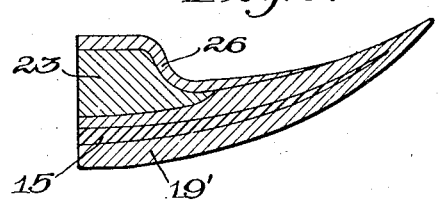

Patented Nov. 18, 1941

2,262,885

UNITED STATES PATENT OFFICE 2,262,885

PLOW BOTTOM PART AND METHOD OF MAKING SAME

Adam J. Condo, Canton, Ill., assignor to International Harvester Company, a corporation of New Jersey Application May 25, 1937, Serial No. 144,681

2 Claims. (Cl. 29—14)

This invention relates to plow bottoms, and particularly to the parts thereof that are subjected to wear, and method of producing the same.

A plow bottom includes particularly a plowshare and a mold-board which receive considerable wear during a plowing operation, the plowshare performing principally the cutting of the soil and the mold-board doing the final turning of soil cut by the plowshare. In the course of this operation, it so happens that there are surface areas on the plowshare and mold-board that receive greater wear than the other surfaces. Heretofore, in the manufacture of plow parts, metal patches of one shape or another have been welded or brazed to these areas in order to provide additional stock at points or areas where the greater wear is found to take place. It is well known that this wear on a plow surface is quite considerable, and, with the advent of speeded up plowing operations, the life of a plow is considerably lessened unless some sort of excess material is disposed in these areas of greater wear. With the new speedy plows, the use of patches has proven to be unsatisfactory. A little wear takes place on the patch, and the welding area between the patch and the plow surface is decreased, and finally due to some shock, the plow patch becomes separated from the plow surface. It is seldom that a satisfactory patch can be provided which will stand the continual stress received during the plowing operation. In order to obtain the best weld, is becomes necessary that only selected patch pieces can be used, leaving the remainder to be discarded or to be further worked to make a satisfactory patch. All of this, of course, increases the cost of manufacturing a plow bottom which is to have excess material at points of extreme wear.

It is the object of this invention to provide plow bottom parts which have the necessary excess material at points where the extreme wear is to be expected, but to provide the same by a method other than by a fire-welding operation, whereby the hazards and uncertainty of fire welding are eliminated.

It is another object of the invention to provide plow bottom parts which are less expensive to manufacture by virtue of the fact that a skilled welding operator and selected metal patches are not prerequisite in their manufacture.

Generally, plow bottom parts today are made of what is known in the trade as soft center steel. This steel is made at a regular rolling mill by hammering or rolling of previously prepared ingots, which have a core of soft or low carbon steel, about which is disposed an enclosing mass of high carbon steel. When the ingot is rolled to its final thickness, there is provided a material made up of three layers, the soft or low carbon steel being disposed between two outer layers of high carbon steel. The thickness of the various layers may be predetermined by the size of ingot and disposition as to the amount of material, as well as by the amount of rolling of the material. The layers may be of different thicknesses or may be uniform according to specification. The wear, or high carbon, layer may be thicker on one side than on the side not subjected to wear, providing what might be known in the trade as offset soft center steel.

According to the present invention excess material is added to portions of the plow parts by utilizing off-center stock of thicker wear surface area than throughout the remainder of the plow part. This is preferably done by making the plow part out of two blanks, one of which has an outer wear surface area of greater thickness than the other blank, and welding the blanks together in edge to edge relation to make up the final plow part. By this, there is provided in effect a metal patch in areas, which is more satisfactorily welded than could possibly be done by the old fire-welding method. The patch is fixed to the plow part during fabrication of the stock material that goes to make up the finished plow part. Also, according to the invention, in the case of a plowshare, this cross weld is so made with reference to the location of the land side that the land-side serves to reenforce the cross weld, though it is found that the cross weld of this offset material is satisfactory and might well withstand the usual stresses by itself.

For other objects and for a better understanding of this invention, reference may be had to the following detailed description considered in conjunction with the accompanying drawings, in which:

Figure 1 is a perspective plan view of a plowshare blade and point prior to welding together of the increased thickness portion to the main portion;

Figure 2 is a similar perspective plan view with the portions welded together and showing the line of weld;

Figure 3 is a perspective view of a land-side and an associated patch prior to the welding and shaping operation;

Figure 4 is a perspective view of the structure shown in Figure 2 with the land-side in position prior to shaping and welding;

Figure 5 is a perspective view of the finished plowshare after shaping and welding, showing the plowshare inverted and lying on its top wear face;

Figure 6 is a cross section of the point portion taken on the line 6—6 of Figure 5;

Figure 7 illustrates a step in the butt welding operation of the two portions of the plowshare prior to hammering of the weld;

Figure 8 is an enlarged view of the weld after hammering, taken on the line 8—8 of Figure 2;

Figures 9 and 10 are views, similar to Figures 1 and 2, of a plow mold-board of a plowshare, which also constitutes a part of a plow bottom;

Figure 11 is a cross sectional view taken on the line 11—11 of Figure 10, showing the full length of the portion or blank having an increased thickness layer of the present invention and welded connection; and, Figure 12 is a view in elevation of a plow bottom including the two parts to which the present invention is applied and illustrating the area of increased wear.

In making up the plowshare in accordance with the present invention, the same is made of two blanks or portions, a point portion 15 and a main body or blade portion 16. The main body portion is made of regular stock of sheet material consisting of three layers known as soft center steel. As mentioned above this steel is made by a rolling operation of a previously formed ingot having a soft center. In Figure 8 is an enlarged section of this material, the center material being of low carbon, soft steel, and the two outer layers being of high carbon steel to withstand wear and at the same time to provide rigidity to the sheet material. The soft center or low carbon steel layer provides a steel which is tougher to withstand great shock received in the plowing operation. It is preferable that none of this soft material be exposed to wear. The layers may be designated as 17, 18 and 19, the layer 18 being the intermediate layer of soft steel. The outer layers 17 and 19 may be of different thicknesses, depending upon the specifications required; however, it is more usual that these layers be of the same thickness. For instance, the wear layer 19 could be thicker than the layer 17.

The point portion 15 is also made of similar laminated stock with layers 17', 18' and 19', but purposely has its wear layer 19' thicker than the wear layer of the body portion. These point portions are made up at a regular rolling mill. It is this operation that makes for invention of the present method over the previous patching operation that was done heretofore. In one sense it may be said that the patch is placed on the plow stock at the rolling mill during the fabrication of the material, at which place the most satisfactory type of weld is obtained. Prior to fixing of the point portion 15 to the body portion 16, the rearward part of the point portion is hammered to provide at the rear or welding edge the same thickness of stock as that of the body portion, since a smooth work surface must finally be provided. The rear edge 15a and the front edge 16a are then joined in a welding operation, or butt-welded together, preferably by electric flash welding. For a more satisfactory weld the edge portions are preferably heated to a red heat prior to the electric flash welding. A weld is now provided, as indicated at 21 of Figure 2. Figure 2 shows the joined blade and point prior to attaching the land-side and prior to the final shaping and welding operation.

In Figure 7 there is shown an enlarged section of the disposition of the low carbon and high carbon materials 18, 17 and 19, and 18', 17' and 19', respectively, in the region of the weld. It will be seen that, as indicated at 22 of Figure 7, the soft steel portion is considerably expanded and fully enclosed by the high carbon steel layers. These high carbon steel layers protrude above the surface of the stock material. They are now flattened by a hammering operation to be flat and to fully enclose the soft portion 22, as illustrated in Figure 8. It has been found that this portion 22 is fully enclosed by the hard or high carbon steel, so that there is no soft metal that is exposed to any wear on the plow surface. After the hammering operation, the weld may be further finished by filing or grinding.

In Figure 3, there is shown the usual land-side 23 having an expanded portion 24 along one edge adapted for providing weld material upon welding the land-side to an assembled point and blade 25. A usual soft patch 26 of low carbon steel is temporarily spot-welded on a bottom edge 27 of the land-side. The land-side is then spot-welded to the unified part 25, as best illustrated in Figure 4, with the side 24 flush with the face of the part 25 and extending across the weld 21. The extension of the land-side 23 across this weld 21 will add to the stiffness of the weld, providing a more efficient joint. The land-side 23 is made of soft or low carbon steel, since it is not exposed to extreme wear and also so that it will wear down equally with the hard surface of the point portion to automatically keep a hard, sharp layer on its point.

The structure shown in Figure 4 is now placed in a heating furnace and then forged and welded to provide the final plowshare shape shown in Figure 5, with the various low carbon and high carbon steels disposed at the desired points.

Figure 6 is an enlarged section showing the distribution of the soft and hard steels, after the welding operation, at a section 6—6 of Figure 5 which includes the flattened, soft patch 26, flattened end of land-side 23, and point portion 15 including its thick patching layer 19'. It may now be seen that the layer 19', instead of being patched as heretofore in prior constructions, is actually a portion of the three ply material and has the advantage of having been welded at the time of fabricating the three ply material. The prior method, over which this invention is an improvement, was to fire-weld a hard patch to the regular hard layer of previously fabricated stock material. This patch, even after welding and shaping of the plow part, could not be depended upon, once wear had started to take place over the patched area.

It shall be understood that a "patch" is a hard layer portion which is ordinarily placed on areas of greater wear by the usual fire-welding method. The present invention attempts to avoid fire-welded patches.

In Figures 9 and 10, there is shown another part of a plow bottom, to which the present invention may also be applied. There is shown a mold-board, generally designated by the numeral 31, made from two blank portions 32 and 33, the former portion forming the major or blade part of the mold-board, and the portion 33 forming the point portion of the mold-board, where excess wear takes place. In order to provide for an equal wearing down of the mold-board surface, the portion 33 has a layer 33' of greater thickness than the wear layer 32' of the major portion 32. These two portions are welded together in edge-to-edge relation, as indicated at 34 of Figures 10 and 11. Thus, it will be seen that a mold-board has been provided which is made of laminated material, but with a wear layer in portions of greater wear which is thicker than throughout the blade portion of the mold-board. The mold-board is made of the usual soft center steel and, if desired, the wear layer may be of any thickness relative to the thicknesses of the other layers of the material.

Once the point portion 33 has been welded to the major portion 32 by the usual electric flash-welding method, hammering of the hard surface layers is necessary to enclose the soft center portion, to give the even thickness of material, as well as to prevent immediate exposure of any of the soft metal upon the wearing down of the hard layer. It is to be noted that the thick layer 33' is tapered down at its rear edge to be of the same thickness of the material as the major portion 32. This operation is usually effected by heating the blanks 33 and hammering the rear portion of the blank to the desired thickness. Once the weld 34 is made and leveled, the mold-board is ready to be given its final shape. This is done by the usual heating and forging operation.

In Figure 12, there is illustrated a plow bottom having the plowshare and mold-board above described, and showing the relative locations of the excess wear layers in the assembled plow bottom. It has been determined that the greatest wear takes place over the portions 15 and 33. The portion 15 receives great wear because it does the initial cutting and lifting of the soil, whereas the portion 33 effects the greater turning of the soil.

Fire-welded patches have been used in these areas heretofore, which have proven unsatisfactory. The present invention has provided a more satisfactory method of adding material at these areas 15 and 33, wherein the excess wear material is provided during the fabrication of the steel, thereby making a better union of the material, and not a joint which is dependent upon the skill of a welding expert, thus eliminating the hazards and uncertainty of fire-welding.

It is to be understood that the present invention may take other forms, but these forms shall be within the spirit and scope of the present invention as defined by the appended claims.

What is claimed as new is:

1. A plow part which is subject to substantial wear over one face, the wear in a certain area being greater than in another area, comprising a first part composed of two layers of hard steel and an intermediate layer of soft steel and being of uniform thickness, and a second part also composed of two layers of hard steel and an intermediate layer of soft steel, one layer of hard steel being of greater thickness than one layer of hard steel of the first part, the other layer of hard steel and the layer of soft steel being equal in thickness, respectively, to the other layer of hard steel and the layer of soft steel of the second part, the parts being welded in edge-to-edge relation so as to extend in the same plane.

2. A plow part which is subject to substantial wear over one face, the wear in a certain area being greater than in another area, comprising a first part of uniform thickness and comprising two layers of hard steel of uniform thickness and an intermediate layer of soft steel of uniform thickness, and a second part of varying thickness, the least thickness being at one end and equal to the thickness of the first part, said second part being composed of one outside layer of hard steel of uniform thickness and an intermediate layer of soft steel of uniform thickness equal in thickness, respectively, to the one hard outside layer and the soft intermediate layer of the first part, and a second hard outside layer of varying thickness, the least thickness being at one end and equal to the thickness of the other hard layer of the first part, the parts being welded together in edge-to-edge relation so as to extend in the same plane.

ADAM J. CONDO.